Figure 1:
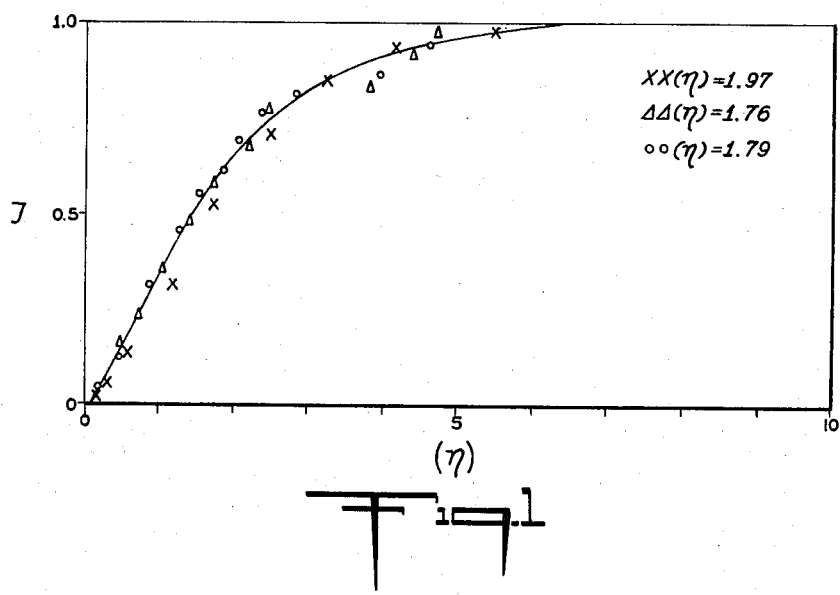

INVENTOR
HERMANN WESSLAU

INVENTOR
HERMANN WESSLAU

United States Patent Office 3,357,967
Patented Dec. 12, 1967

3,357,967
POLYMERIZATION CATALYST AND PROCESS
Hermann Wesslau, Mulheim (Ruhr), Germany, assignor to Studiengesellschaft Kohle m.b.H., Mulheim (Ruhr), Germany, a corporation of Germany
Filed Nov. 12, 1965, Ser. No. 539,225
Claims priority, application Germany, Aug. 14, 1957, St 12,884
29 Claims. (Cl. 260—94.6)

This application is a continuation-in-part of application Ser. No. 753,872, filed Aug. 8, 1958.

The invention relates to a polymerization catalyst and process. The invention more particularly relates to an olefin polymerization catalyst having three essential components and to a process for producing polyethylene with a narrow molecular weight distribution, utilizing this catalyst.

It is well known that the technicological properties of high molecular weight polymeric materials, as for example polyethylene, depend in a complicated manner on the structural elements of the polymer molecules and the relative frequency with which molecules occur in the mixture (H. A. Stuart: Die Physik der Hochpolymeren, 4th vol.: Theory and molecular significance of the technological properties of high polymer materials, Springer-verlag 1956, page 625). Polyethylene prepared by the process of K. Ziegler (Belgian Patent Nos. 533,362, 534,792, 534,888, 540,459, 542,658, 543,913, and 543,912, and French Patent No. 1,137,459) is formed of molecules consisting substantially of unbranched paraffin chains, i.e., linear polyethylene. If this simple structure of the individual molecules is accepted, there are only two variables which can produce a modification of the technological properties of the polymeric material:

(I) The mean chain length (weight average molecular weight)

(II) The proportion of the separate chain lengths having a constant average chain length (number average molecular weight).

The ratio of weight average molecular weight to number average molecular weight is usually employed to determine the non-uniformity value of a polymer, the value being used to characterize the range of molecular weight distribution of the polymer. According to G. V. Schulz in H. A. Stuart's Die Physik der Hochpolymeren, 2nd vol., page 754, the non uniformity value for a macromolecule in solution is at follows:

$U$ (non-uniformity) =

$$\frac{\overline{M}_w \text{ (wt. average molecular weight)}}{\overline{M}_n \text{ (number average molecular weight)}} - 1$$

$\overline{M}_w$ and $\overline{M}_n$ can be calculated by measurements of the molecular weight and molecular weight distribution determined by current and conventional methods (G. V. Schulz and M. Marx: Makromolekulare Chemie, XIV (1954), pages 53–64).

The distribution of the different chain lengths in a polymer mixture is described by the so-called chain length or molecular weight distribution function. In the publications by H. Wesslau, Makromolekulare, Chemie, XX (1956), pages 111–142, and L. H. Tung, J. Pol. Science, XXIV (1957), pages 333–348, analyses of these distribution functions of low-pressure polyethylene are given, which confirm that the polymers produced by that process have fairly wide molecular weight distributions. This indicates that they contain a fairly large proportion of polyethylene having a relatively low molecular weight. However, according to H. Mark and H. A. Stuart's Die Physik der Hochpolymeren, 4th vol.: Theory and molecular significance of the technological properties of high-polymer materials, Springerverlag 1956, page 632, these low molecular fractions are, however, ". . . particularly unfavorable with respect to properties with impack bending strength, toughness, friction, and fatigue, in that they give rise to rigid areas (regions of small crystals of low molecular weight polymers) at which strong peak potentials are developed, giving rise to premature yielding of material."

The catalysts useful for the polymerization of ethylene according to the Ziegler Belgian patents set out above are usually obtained from compounds of elements of the 4th to 8th sub-groups of the Periodic System, together with metal alkyl or metal aryl compounds of metals of the 1st to 3rd groups of the Periodic System, particularly titanium compounds and organic aluminum compounds, for example:

(I) $TiCl_4 + AlR_3$
(II) $TiCl_4 + ClAlR_2$
(III) $TiCl_3 + AlR_3$
(IV) $TiCl_3 + ClAlR_2$
(V) $TiCl_3 + TiCl_4 + Cl_2AlR$, etc.

} Dissolved or suspended in a saturated hydrocarbon.

In cases in which titanium tetrachloride is initially used with a dialkyl aluminum compound (I and II), a reduction of the tetrachloride occurs and deposits of compounds of low-valence titanium are formed, so that all such catalyst systems are composed of a finely divided solid phase and a solution, as for example

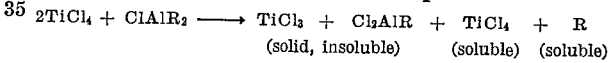
$2TiCl_4 + ClAlR_2 \longrightarrow TiCl_3 + Cl_2AlR + TiCl_4 + R$
(solid, insoluble) (soluble) (soluble)

If insoluble $TiCl_3$ is initially employed, the solid phase is present from the outset. As a consequence, different compounds of titanium and of aluminum can still be dissolved in the hydrocarbon in which the solid phase is suspended. It is known that the brown deposit which is formed from titanium tetrachloride and dialkyl aluminum monochloride and which contains the low valence titanium compound can be liberated from such soluble titanium and aluminum compounds by washing with a completely dry, air-free hydrocarbon, the catalytic activity being thereby largely lost. The activity can be restored by adding different activators (see IV and V). An especially effective form of reactivation consists in the addition of titanium tetrachloride and alkyl aluminum dichloride to such a suspension of $TiCl_3$ in a hydrocarbon according to V. Such catalyst mixtures have accurately adjustable compositions. Depending on the particular composition, they convert ethylene into products having different average molecular weights.

The polymers obtained by these procedures usually have a very broad molecular weight distribution. It is immaterial as regards the form and breadth of the distribution whether the aluminum compound is used as a dialkyl aluminum monochloride (according to II or IV) or as an alkyl aluminum dichloride (according to V).

While it is known that a selection of the catalyst components and/or their ratios may affect the weight average molecular weight of the polymer formed (see Belgian Patent 540,459) this selection of the catalyst components and/or their ratios has had no effect for producing a polymer having a narrow molecular weight distribution range (low U value). It has been proposed to narrow the molecular weight distribution range by controlling the polymerization conditions, namely by effecting the polymerization at a temperature above the melting point of the polyethylene produced, so that the same is produced as a solution. The effecting of the polymerization at a lower temperature in which the polyethylene forms as a slurry is, however, preferred from a process standpoint.

One object of this invention is an olefin polymerization catalyst which favors the production of polyethylene having a narrow molecular weight distribution range.

A further object of this invention is an olefin polymerization catalyst which allows the production of polyethylene with a narrow molecular weight distribution range at a temperature below the melting point of the polyethylene produced, i.e. by the slurry process.

A still further object of this invention is a process for producing polyethylene of a narrow molecular weight distribution range which does not require the elevated temperatures of the solution system.

These and still further objects will become apparent from the following description:

The polymerization catalyst in accordance with the invention comprises the product formed by mixing (A) Titanium trichloride
(B) $Ti(R)_4$
(C) $R'Al(R)_2$ in which formulas $R'$ represents an alkyl radical and $R$ halogen, alkoxy or aroxy radicals. The $R$ as set forth in the formula may, of course, represent the same or different radicals of the group specified, and this is understood hereinafter and in the claims.

Essential in accordance with the invention, between components (B) and (C) above, there must be present at least one halogen atom and at least one alkoxy or aroxy radical. The ratio between the number of halogen atoms and the number of alkoxy or aroxy radicals may vary within wide limits, as for example between 0.1 and 10, though ratios between 1 and 4 have proved particularly advantageous in accordance with the invention.

If the number of mols of (A) is represented by $m$, the number of mols of (B) represented by $p$, and the number of mols of (C) represented by $n$, then the number of mols of the radical $r$ will be equal to $2n+4p$.

For example, a catalyst mixture in accordance with the invention can contain 10 mmols of TiCl, 4 mmols of $Ti^{4+}$; 4 mmols of $AlC_2H_5$ groups; $16m$ atoms of Cl atoms and 8 mmols of ethoxy groups. This mixture can be prepared from:

(1) 10 mmols $TiCl_3 + 4$ mmols $TiCl_4$
    $+ 4$ mmols $C_2H_5Al(OC_2H_5)_2$ (2) 10 mmols $TiCl_3 + 2$ mmols $TiCl_4$
    $+ 2$ mmols $Ti(OC_2H_5)_4 + 4$ mmols $Cl_2AlC_2H_5$ (3) 10 mmols $TiCl_3 + 4$ mmols $Cl_2Ti(OC_2H_5)_2$
    $+ 4$ mmols $Cl_2AlC_2H_5$ (4) 10 mmols $TiCl_3 + 4$ mmols $Cl_2TiOC_2H_5$
    $+ 2$ mmols $Cl_2AlC_2H_5 + 2$ mmols $(C_2H_5O)_2AlC_2H_5$ All these systems produce identical catalyst systems and substantially similar polymers. The reason for the identical activity of the different mixtures is obviously that exchange reactions probably take place between the components of the mixture (apart from the insoluble ($TiCl_3$), which reactions finally lead to conditions of equilibrium between the different possible materials. Examples of possible exchange reactions of this type are:

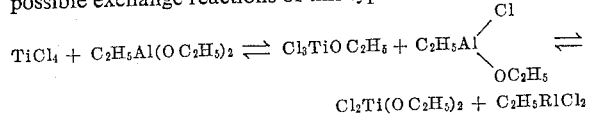

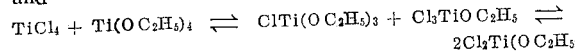

and

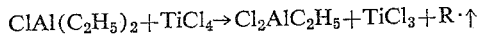

The exact nature of the stable final conditions has so far not been ascertained and an understanding of these conditions is not important for the understanding and carrying out of the invention.

The catalyst in accordance with the invention may be used for the polymerization of olefins, such as ethylene, in the manner and under the conditions that are conventional for Ziegler catalysts, as for example described in the above mentioned Ziegler Belgian patents. In connection with the polymerization of ethylene, the polymerization is preferably effected at a temperature below the melting point of the polymer produced, so that the polymerization is effected as a slurry system. The polymerization may be effected at normal or elevated pressure, with pressures between 1 and 10 atmospheres gauge being preferred. The polyethylene produced is characterized by a narrow molecular weight distribution having a U value below 6 and preferably between 2 and 4.

In the explanations which have just been given with respect to the catalysts, it has merely been assumed for the purposes of simplification that the initial catalyst systems are those in which the number of titanium atoms (apart from $TiCl_3$) and of the aluminum atoms in the solution are the same. This equality between the number of aluminum and titanium atoms in the soluble catalyst components is, however, not essential for the invention. The molar values of the soluble titanium and aluminum compounds can also each fluctuate between 0.5 mmol and 100 mmols to each 10 mmols of $TiCl_3$. It is to be noted that the mean molecular weight of the polymer changes as the proportions between the titanium compounds and the aluminum compounds are changed, so that, by such changes in the catalyst system, a means is available for controlling the molecular weights to within a desired range.

The figures of columns 1 and 2 of the following table indicate the number of millimols of the corresponding compound or atom group, which is dissolved as well as 10 mmols of $TiCl_3$ in 1 liter of hydrocarbon:

TABLE I

| Al-R | $Ti^{4+}$ | Ratio Al-R:$Ti^{4+}$ | $[\eta]$ |
|---|---|---|---|
| 4.0 | 40.0 | 0.1 | 0.9 |
| 6.6 | 13.2 | 0.5 | 1.3 |
| 4.0 | 4.0 | 1.0 | 1.9 |
| 8.0 | 4.0 | 2.0 | 2.8 |
| 10.0 | 4.0 | 2.5 | 3.9 |
| 8.0 | 2.0 | 4.0 | 5.4 |

The mean molecular weight of a polymer is only slightly affected by the absolute concentrations of the $>$Al-R and the $Ti^{4+}$ compounds in the catalysts used in the polymerization reaction wherein the average molecular weight is being controlled. The ratio $>$Al-R:$Ti^{4+}$ is, as is obvious from Table I, of decisive importance for this purpose.

Catalysts which are particularly suitable for use in the process of the invention are obtained if there is initially prepared from titanium tetrachloride and dialkyl aluminum chloride a sparingly soluble brown deposit having the approximate composition $TiCl_3$, and if this is rinsed and then mixed in suspension in a hydrocarbon with the other two activating components. It is, however, not necessary to employ this process which, while reliable, is quite complicated. It is possible to dispense with the washing operation, but then the subsequent additions of the activators must be appropriate to the purpose of the invention. This will now be explained in detail.

If, for example, titanium tetrachloride is treated with diethyl aluminum chloride, substantially the following reaction takes place:

$ClAl(C_2H_5)_2 + TiCl_4 \rightarrow Cl_2AlC_2H_5 + TiCl_3 + R \cdot \uparrow$

In this case, the alkyl radicals which are split off are lost. In addition to the brown precipitate, the reaction mixture also contains alkyl aluminum dichloride. It will immediately be seen that such polyethylene catalyst can be converted by the addition of:

$$Ti(OR)_4; TiCl_4; C_2H_5Al(OR)_2$$

or corresponding mixed compounds having OR and Cl on the same atom; into a catalyst system which in accordance with the invention results in a polyethylene having narrow molecular weight distribution.

The above concept, namely of using a catalyst comprising a mixture of three separate components: (1) titanium trichloride; (2) at least one compound of tetravalent titanium $Ti(R)_4$; and (3) at least one organoaluminum compound $R'Al(R)_2$ wherein $R'$ designates an alkyl group and R represents either halogen, an alkoxy or aroxy radical, it being essential that there be present in the catalyst mixture at least one alkoxy or aroxy radical and at least one halogen atom other than the chlorine of the trivalent titanium compound, in the polymerization of ethylene in order to obtain a polymer having a narrow molecular weight distribution, is most surprising in view of the art. The art heretofore believed that the molecular weight could be controlled by the reaction temperature of the polymerization process and was completely independent of the nature of the catalyst components employed. The temperature required for molecular weight control was a temperature at which both the monomer and polymer were in solution.

In addition to the use for polymerizing ethylene to polyethylene having a narrow molecular weight distribution range, the catalysts in accordance with the invention may also be used for the polymerization of other olefins and diolefins under conditions conventional with respect to the use of Ziegler catalysts for this purpose.

Figure 2:
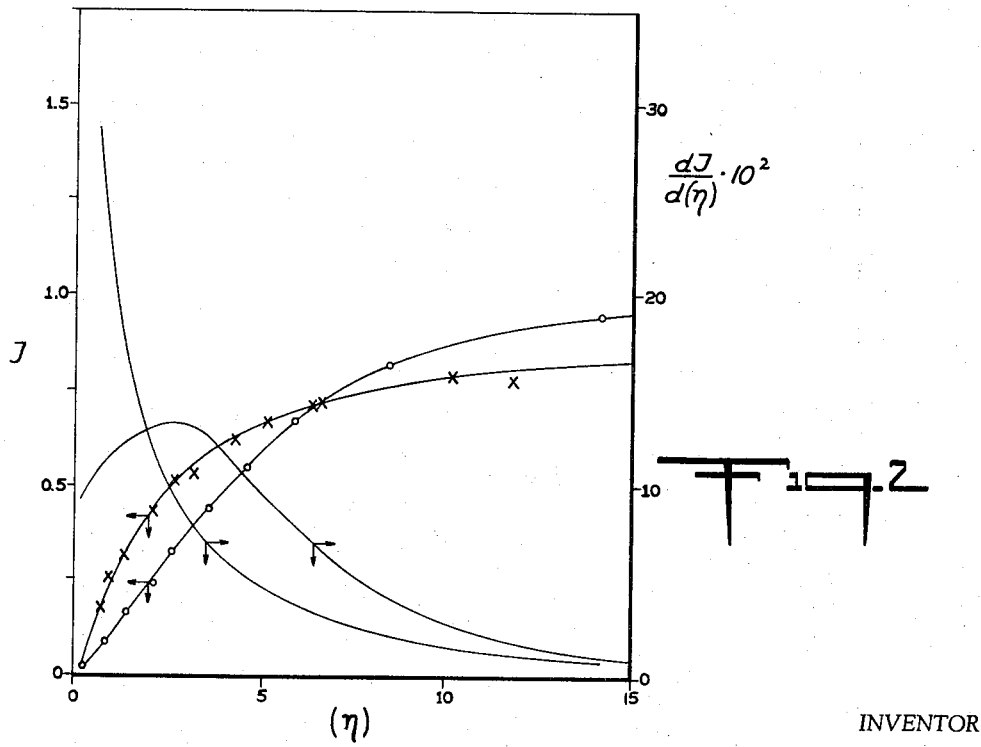
Figure 3:
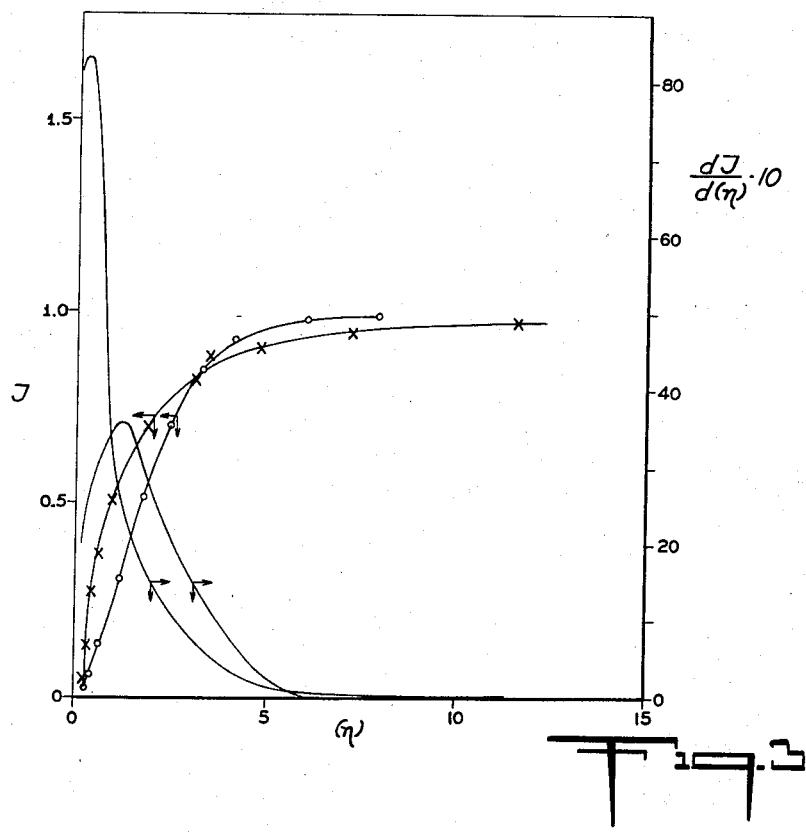
Figure 4:
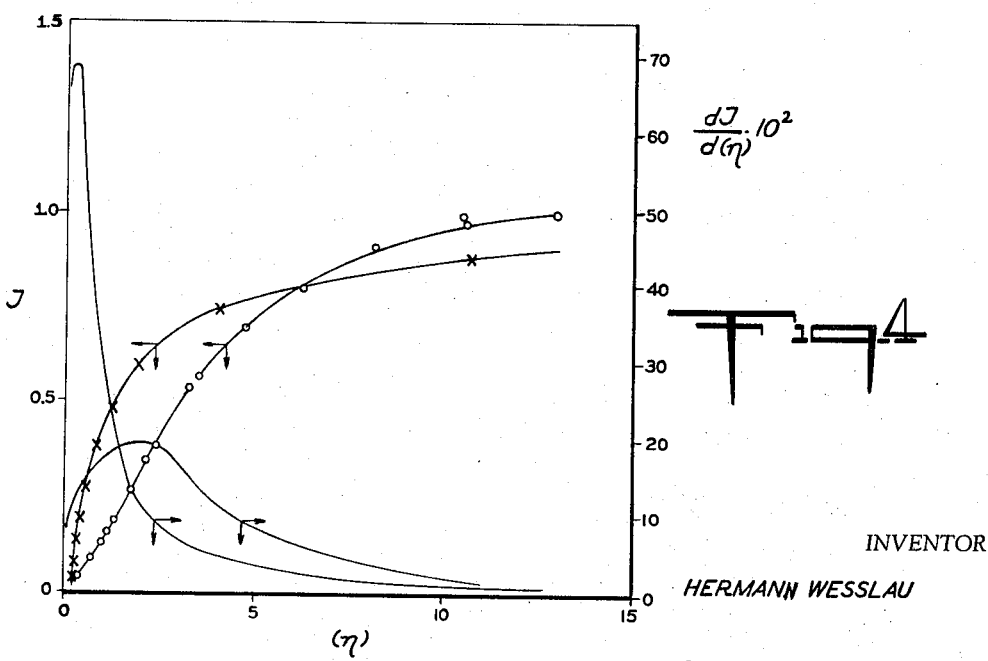

The invention is more fully explained in the following examples. Examples 1 to 3 relate to the conventional processes which have so far been practiced, while the further examples relate to the process of the invention. The distribution curves associated with the examples are set out as FIGURES 1 to 4 of the accompanying drawings. Comparison shows that the process of the invention actually yields polyethylenes having very narrow molecular weight distribution.

In the examples, U is taken from the Schulz formula to indicate each polymer. For the polymers produced by the process of the invention, it is between 2 and 4; polymers which were produced by the conventional processes have non-uniformity values (U) of between 6 and 15.

Dependent on the non-uniformity is the proportion of very short-chained constituents in the polymer. Since this proportion is of decisive importance for certain mechanical properties of the polymer, the percentage with molecular weights smaller than 10,000 has also been given in each example. With the polymers which were produced by the process of the invention, this proportion is 25 to 30% of the quantity contained in polymers of the same viscosity factor which were produced by the known process.

The folowing examples will further illustrate this invention, but the invention is not restricted to these examples:

*Example 1*

A suspension of a low-valency titanium compound (hereinafter briefly referred to as TiCl₃ suspension) was prepared as follows: 67.7 g. of diethyl aluminum monochloride were dissolved in 2 liters of absolute air-free diesel oil and 35.0 g. of titanium tetrachloride were added dropwise while stirring. The brown precipitate which formed was then rinsed with absolute diesel oil until the chlorine reaction in the washings completely disappeared, and then made up to 1 liter with the same solvent. 10 cc. of this suspension correspond to 1.85 mmols of $TiCl_3$ (determined by titration against $FeCl_3$).

10 mmols of $TiCl_3$ were then suspended in 750 ml. of absolute diesel oil in a nitrogen atmosphere, and 13.2 ml. of a 0.5-molar $TiCl_4$ solution (=6.6 mmols of $TiCl_4$) and 13.2 ml. of a 0.5 molar $C_2H_5AlCl_2$ solution (=6.6 mmols of $C_2H_5AlCl_2$) were added. The resulting liquid was made up with absolute diesel oil to 1 liter and ethylene was passed through the mixture for 1 hour at 60° C. while stirring. The polymerization was terminated by adding 50 ml. of n-butanol and the polymer was washed with n-butanol and then with acetone and dried for 24 hours at 60° C. Yield: 33.2 g. $[\bar{\eta}]=1.90$; $U=6.3$. 29% had a molecular weight M of <10,000.

*Example 2*

The same procedure as in Example 1 was used, working with the following catalyst mixture in 1 liter of diesel oil: 10 mmols $TiCl_3$+1 mmol $TiCl_4$+1 mmol $C_2H_5AlCl_2$. Yield: 37.7 g. $[\bar{\eta}]=3.95$; $U=12.1$. 19% of the product had a molecular weight of <10,000.

*Example 3*

The same procedure as in Example 1 was used, working with the following catalyst mixture in 1 liter of diesel oil: 10 mmols $TiCl_3$+1 mmol $TiCl_4$+3 mmols $$C_2H_2AlCl_2$$

Yield: 31.8 g. $[\bar{\eta}]=5.40$; $U=12.8$. 10% of the product had a molecular weight of <10,000.

*Example 4*

The same procedure as in Example 1 was used, working with the following catalyst mixture in 1 liter of diesel oil: 10 mmols $TiCl_3$+4 mmols $TiCl_4$+4 mmols $$C_2H_5Al(OC_8H_{17})_2$$

Yield: 28.9 g. $[\bar{\eta}]=1.97$; $U=2.6$. 9% of the product had a molecular weight of <10,000.

*Example 5*

The same procedure as in Example 1 was used, working with the following catalyst mixture in 1 liter of diesel oil: 10 mmols $TiCl_3$+4 mmols $TiCl_4$+4 mmols $$C_3H_7Al(OC_6H_5)_2$$

Yield: 24.4 g. $[\bar{\eta}]=1.76$; $U=2.9$. 11% of the product had a molecular weight of <10,000.

*Example 6*

The same procedure as in Example 1 was used, working with the following catalyst mixture in 1 liter of diesel oil: 10 mmols $TiCl_3$+2 mmols $TiCl_4$+2 mmols $$Ti(OC_4H_9)_4+4 \text{ mmols } C_2H_5AlCl_2$$

Yield: 32.5 g. $[\bar{\eta}]=1.79$; $U=3.0$. 13% of the product had a molecular weight of <10,000.

*Example 7*

The same procedure as in Example 1 was used, working with the following catalyst mixture in 1 liter of diesel oil: 10 mmols $TiCl_3$+4 mmols $Ti(OC_4H_9)_4$+8 mmols $C_2H_5AlCl_2$. Yield: 32.3 g. $[\bar{\eta}]=2.78$; $U=2.7$. 6% of the product had a molecular weight of <10,000.

*Example 8*

The same procedure as in Example 1 was used, working with the following catalyst mixture in 1 liter of diesel oil: 10 mmols $TiCl_3$=4 mmols $Ti(OC_4H_9)_4$+10 mmols $C_2H_5AlCl_2$. Yield: 26.5 g. $[\bar{\eta}]=3.92$; $U=2.8$. 4% of the product had a molecular weight of <10,000.

*Example 9*

The same procedure as in Example 1 was used, working with the following catalyst mixture in 1 liter of diesel oil: 10 mmols $TiCl_3$+2 mmols $TiCl_4$+8 mmols $$C_2H_5Al(OC_8H_{17})_2$$

Yield: 35.0 g. [$\bar{\eta}$]=5.44; U=3.9. 2.5% of the product had a molecular weight of <10,000.

*Example 10*

The same procedure as in Example 1 was used, working with the following catalyst mixture in 1 liter of diesel oil: 10 mmols TiCl$_3$+6.6 mmols C$_2$H$_5$AlCl$_2$+13.2 mmols Cl$_3$TiOC$_4$H$_9$. Yield: 26.5 g. [$\bar{\eta}$]=1.30; U=3.2. 20% of the product had a molecular weight of <10,000.

I claim:
1. A polymerization catalyst comprising the product formed by mixing:

(a) Titanium trichloride
    (b) Ti(R)$_4$
    (c) R'Al(R)$_2$

R' being alkyl and R halogen, alkoxy or aroxy radicals, wherein between (b) and (c) there is present at least one halogen atom and at least one alkoxy or aroxy radical.

2. A polymerization catalyst according to claim 1 in which the ratio between the halogen atoms and the sum of the alkoxy and aroxy radicals lies between 0.1 and 10.

3. A polymerization catalyst according to claim 1 in which the ratio between the halogen atoms and the sum of the alkoxy and aroxy radicals lies between 1 and 4.

4. A polymerization catalyst according to claim 1 in which (a) is formed by reacting titanium tetrachloride with a dialkyl aluminum chloride, and at least one of (b) and (c) containing at least one alkoxy or aroxy radical is added to the reaction mixture.

5. A polymerization catalyst according to claim 1 in which (a) is mixed as the substantially insoluble brown precipitate obtained from the reaction of titanium tetrachloride and dialkyl aluminum chloride.

6. A polymerization catalyst according to claim 1 in which (b) and (c) are each present in a molar ratio of 0.5 to 100 mmols per 10 mmols of (a).

7. A polymerization catalyst according to claim 1 in which R in (c) represents two different of said group members.

8. A polymerization catalyst according to claim 1 in which (a), (b) and (c) are present in molar ratios represented by whole integers and in which the ratio between the halogen atoms and the sum of the alkoxy and aroxy radicals lies between 0.1 and 10.

9. A polymerization catalyst according to claim 1 in which (b) is titanium tetrachloride and (c) is a dialkyl alkoxy aluminum compound.

10. A polymerization catalyst according to claim 1 in which (b) is a titanium alkoxy compound and (c) is an aluminum alkyl halide.

11. A process for the polymerization of ethylene to solid polymers having a narrow molecular weight distribution range (U value) below 6, which comprises polymerizing the ethylene at a temperature below the melting point of the polyethylene formed with a polymerization catalyst comprising the product formed by mixing:

(a) Titanium trichloride
    (b) Ti(R)$_4$
    (c) R'Al(R)$_2$

R' being alkyl and R halogen, alkoxy or aroxy radicals, wherein between (b) and (c) there is present at least one halogen atom and at least one alkoxy or aroxy radical.

12. A process according to claim 11 in which said polymerization is effected at a pressure between about 1 and 10 atmospheres.

13. Process according to claim 11 in which in the catalyst the ratio between the halogen atoms and the sum of the alkoxy and aroxy radicals lies between 1 and 4.

14. Process according to claim 11 in which in the catalyst (a) is formed by reacting titanium tetrachloride with a dialkyl aluminum chloride, and at least one of (b) and (c) containing at least one alkoxy or aroxy radical is added to the reaction mixture.

15. Process according to claim 11 in which in the catalyst (a) is mixed as the substantially insoluble brown precipitate obtained from the reaction of titanium tetrachloride and dialkyl aluminum chloride.

16. Process according to claim 11 in which in the catalysts (b) and (c) are each present in a molar ratio of 0.5 to 100 mmols per 10 mmols of (a).

17. Process according to claim 11 in which in the catalyst R in (c) represents two different of said group members.

18. Process according to claim 11 in which in the catalyst (a), (b) and (c) are present in molar ratios represented by whole integers and in which the ratio between the halogen atoms and the sum of the alkoxy and aroxy radicals lies between 0.1 and 10.

19. Process according to claim 11 in which in the catalyst (b) is titanium tetrachloride and (c) is a dialkyl alkoxy aluminum compound.

20. Process according to claim 11 in which in the catalyst (b) is a titanium alkoxy compound and (c) is an aluminum alkyl halide.

21. In the process of polymerizing ethylene to a solid polymer having a high molecular weight and a narrow molecular weight distribution range, the improvement which comprises polymerizing ethylene in the presence of a polymerization catalyst consisting essentially of a mixture of titanium trichloride, at least one compound of tetravalent titanium Ti(R)$_4$ and at least one organic aluminum compound soluble in a liquid hydrocarbon and having the general formula R'Al(R)$_2$ in which R' is alkyl and R is selected from the group consisting of halogen, alkoxy and aroxy radicals, wherein between said tetravalent titanium compound and said organic aluminum compound there is present in said mixture at least one halogen atom and at least one member selected from the group consisting of alkoxy and aroxy radicals.

22. Improvement according to claim 21, wherein R in said organic aluminum compound represents two different group members.

23. Improvement according to claim 21, wherein the catalyst mixture corresponds to a composition of

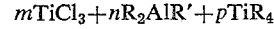

$$mTiCl_3 + nR_2AlR' + pTiR_4$$

wherein R' and R are as above defined, m, n, and p are whole numbers and wherein the ratio between the halogen atoms and the sum of the alkoxy and aroxy radicals lies between 0.1 and 10.

24. Improvement according to claim 21, where said catalyst is formed by reacting titanium tetrachloride with dialkyl aluminum chloride and to the reaction mixture there is added a member selected from the group consisting of compounds having the formula Ti(R)$_4$, wherein R is selected from the group consisting of halogen and OR radicals, the radical OR representing a member selected from the group consisting of alkoxy and aroxy radicals, at least one of R being an OR radical and R'AlClOR, wherein R and OR are defined above.

25. Improvement according to claim 21, wherein the titanium trichloride component of the catalyst mixture is admixed with the remaining components of the catalyst mixture as titanium trichloride per se.

26. Improvement according to claim 21, wherein titanium tetrachloride and dialkyl aluminum chloride are reacted, the substantially insoluble brown precipitate thereby formed consisting substantially of titanium trichloride is recovered, washed and suspended in a hydrocarbon and admixed with the remaining components of the catalyst mixture.

27. Improvement according to claim 23, wherein the ratio between the halogen atoms and the alkoxy and aroxy radicals lies between 1 and 4.

28. Improvement according to claim 23, wherein the sum of halogen atoms and of the alkoxy and aroxy radicals is equal to $2n+4p$.

29. Improvement according to claim 21, wherein for each 10 mmols of $TiCl_3$ present in the catalyst mixture, 0.5 mmol to 100 mmols of organic aluminum compound and tetravalent titanium compound, respectively, are present.

References Cited

UNITED STATES PATENTS 2,986,531  5/1961  Schreyer _____ 260—94.9
3,061,602  10/1962  Duck _____ 260—94.9

JOSEPH L. SCHOFER, *Primary Examiner.*

JAMES A. SEIDLECK, *Examiner.*

F. L. DENSON, *Assistant Examiner.*

UNITED STATES PATENT OFFICE
CERTIFICATE OF CORRECTION

Patent No. 3,357,967                            December 12, 1967

Hermann Wesslau

It is hereby certified that error appears in the above numbered patent requiring correction and that the said Letters Patent should read as corrected below.

Column 3, line 46, for "tiCl, 4" read -- $TiCl_3$, 4 --; lines 68 to 72, for that portion of the formula reading $$+C_2H_5RlCl_2 \quad\quad\quad read \quad\quad\quad +C_2H_5AlCl_2$$

same column 3, line 75, for that portion of the formula reading $$(OC_2H_52) \quad\quad\quad read \quad\quad\quad (OC_2H_5)_2$$

column 6, line 26, for "$C_2H_2AlCl_2$" read -- $C_2H_5AlCl_2$ --.

Signed and sealed this 11th day of March 1969.

(SEAL)
Attest:

EDWARD M. FLETCHER, JR.                      EDWARD J. BRENNER
Attesting Officer                              Commissioner of Patents